US010215320B2

(12) United States Patent
Arndt et al.

(10) Patent No.: US 10,215,320 B2
(45) Date of Patent: Feb. 26, 2019

(54) INSTABILITY SUPPRESSION DEVICE FOR PRESSURE CONTROL VALVES

(71) Applicant: InDyne Inc., Reston, VA (US)

(72) Inventors: Scott D. Arndt, Pearland, TX (US);
Harold H. Doiron, Pearland, TX (US);
Ryan P. Jenkins, Crestview, FL (US)

(73) Assignee: InDyne Inc., Reston, VA (US)

( * ) Notice: Subject to any disclaimer, the term of this patent is extended or adjusted under 35 U.S.C. 154(b) by 12 days.

(21) Appl. No.: 15/202,109

(22) Filed: Jul. 5, 2016

(65) Prior Publication Data

US 2017/0002967 A1 Jan. 5, 2017

Related U.S. Application Data

(60) Provisional application No. 62/187,987, filed on Jul. 2, 2015.

(51) Int. Cl.
| | |
|---|---|
| *F16L 55/05* | (2006.01) |
| *F16K 17/02* | (2006.01) |
| *F17C 1/00* | (2006.01) |
| *F16L 55/052* | (2006.01) |
| *F16L 55/053* | (2006.01) |
| *F16L 55/054* | (2006.01) |

(52) U.S. Cl.
CPC .............. *F16L 55/05* (2013.01); *F16K 17/02* (2013.01); *F16L 55/052* (2013.01); *F16L 55/053* (2013.01); *F16L 55/054* (2013.01); *F17C 1/00* (2013.01)

(58) Field of Classification Search
CPC ....... F16L 55/05; F16L 55/054; F16L 55/053; F16L 55/052; F16L 55/055; F17C 1/00; F16K 17/02

USPC .............. 138/26, 30, 31; 220/721, 722, 723
See application file for complete search history.

(56) References Cited

U.S. PATENT DOCUMENTS

| | | | |
|---|---|---|---|
| 2,707,002 A | 4/1955 | Harris | |
| 3,163,985 A | 1/1965 | Bouyoucos | |
| 3,868,972 A * | 3/1975 | Zirps | .......................... F15B 1/18 138/30 |

(Continued)

OTHER PUBLICATIONS

International Search Report issued in related application serial No. PCT/US2016/040985 dated Sep. 22, 2016.

*Primary Examiner* — Ian Paquette
(74) *Attorney, Agent, or Firm* — Jeffrey T. Placker; Holland & Knight LLP

(57) ABSTRACT

A system is provided for reducing instabilities associated with the operation of a pressure control valve. In an embodiment, the system may include a pressure vessel configured for containing a working fluid. A pressure control valve may be configured for pressure dependent flow of the working fluid from the pressure vessel. The pressure vessel may be coupled to the pressure control valve by a fluid conduit. An instability suppression device may be in fluid communication with the fluid conduit between the pressure vessel and the pressure control valve. The instability suppression device may provide a compliant interface with the working fluid. In an embodiment, the instability suppression device may change the acoustic dynamics associated with the fluid path between the pressure vessel and the pressure control valve to control pressure and flow oscillations at an inlet of the pressure control valve.

20 Claims, 3 Drawing Sheets

(56) References Cited

U.S. PATENT DOCUMENTS

| | | | |
|---|---|---|---|
| 3,931,834 A * | 1/1976 | Caillet | F15B 1/14 |
| | | | 138/30 |
| 4,428,401 A | 1/1984 | Chun | |
| 5,845,621 A | 12/1998 | Robinson et al. | |
| 6,925,868 B2 * | 8/2005 | Young | G01F 23/2966 |
| | | | 73/149 |
| 8,869,827 B2 | 10/2014 | Yamauchi | |
| 2002/0059959 A1 * | 5/2002 | Qatu | F16L 55/04 |
| | | | 138/30 |
| 2015/0338012 A1 * | 11/2015 | Cogliati | E03B 7/075 |
| | | | 138/30 |

\* cited by examiner

INSTABILITY SUPPRESSION DEVICE FOR PRESSURE CONTROL VALVES

CROSS-REFERENCE TO RELATED APPLICATIONS

This application claims the benefit of U.S. provisional patent application Ser. No. 62/187,987, filed on Jul. 2, 2015, and entitled "Instability Suppression Device for Pressure Control Valves," the entire disclosure of which is incorporated herein by reference.

TECHNICAL FIELD

The present disclosure generally relates to pressure control valve systems, and more particularly relates to the suppression of instabilities that may arise during the operation of pressure control valve systems.

BACKGROUND

Pressure control valves, such as safety relief valves, regulators, check valves, and the like, are widely used across a variety of industries and in a multitude of applications. In general, a pressure control valve may generally be used to control flow from, or within, a pressurized fluid system. Such valves may often include mechanical springs that hold a valve poppet closed against a poppet seat, thereby sealing the contained pressurized fluid within the pressurized system or regulating pressure and flow to a desired value. When the pressure in the system rises above the relief set pressure of a valve, or when flow demand of a regulator drops the discharge pressure below regulated pressure, the pressure force on the valve poppet area may become large enough to overcome the spring force acting on the valve poppet, and the poppet may lift off of the seat, allowing more fluid to exit the system and relieve pressure, or increase the flow rate. These types of valves are known to have unstable modes of operation than can cause safety critical failures of the valves.

Generally, there are two important sources of pressure losses in inlet piping for a valve that affect its operational stability. The first typical source of instability may relate to flow friction pressure losses between the pressure vessel and the valve, as higher rates of fluid flow begin to flow in the valve inlet piping after the valve opens, or in the case of a regulator, opens to a higher flow rate. As higher rates of fluid flow occur, excessive friction pressure losses may occur in the fluid travelling between the pressure vessel and the valve. Such pressure losses may cause the valve to close, and then re-open as the pressure at the valve inlet recovers after flow stoppage, resulting from the valve closing. The frictional instability may be a cyclic mechanism, with the valve closing as frictional pressure losses rise, and then re-opening once flow stops due to the valve closing.

Acoustic pressure drop at the valve inlet may be caused by acceleration of fluid exiting through the valve, which may create local pressure and flow disturbances traveling at the speed of sound in the valve supply line. The acoustic pressure drop at the valve inlet may be cyclic, with the inlet pressure remaining below the set pressure for the first half of a four-phased cycle of the lowest frequency acoustic mode (i.e., an open-closed organ pipe mode), and above the set pressure for the last two phases of the cycle. The first half cycle time duration may be the time required for the pressure/flow disturbance wave front, traveling at the speed of sound to travel from the valve to the supply tank and back. When the wave front arrives back at the valve, the compressible fluid flow effects behind the wave result in the supply line flow being larger than the valve demand flow. Therefore, this flow is decelerated at the valve inlet, causing a pressure increase at the valve inlet that rises above the valve set pressure during the last half of the cycle when the acoustic wave travels to the supply tank and back again. Since the wave front travels the distance from the valve to the supply tank four times during one cycle, the frequency of the pressure oscillation at the valve inlet is the speed of sound in the working fluid divided by four times the valve inlet pipe length.

Both the frictional and acoustic pressure drop mechanisms may be cyclic, resulting in repeated opening and closing cycles of the valve, which may cause excessive wear and/or damage to the valve. Such wear and/or damage to the valve may result in early or unexpected failure of the valve.

SUMMARY

According to an implementation, a system may include a pressure vessel configured for containing a working fluid. The system may also include a pressure control valve configured for pressure dependent flow of the working fluid from the pressure vessel. The system may also include a fluid conduit coupling the pressure vessel and the pressure control valve. The system may further include an instability suppression device in fluid communication with the fluid conduit between the pressure vessel and the pressure control valve. The instability suppression device may provide a compliant interface with the working fluid.

One or more of the following features may be included. The working fluid may include a gas. The working fluid may include a liquid. The working fluid may include a gas-liquid mixture. The pressure control valve may include a pressure relief valve. The pressure control valve may include a pressure regulator.

The instability suppression device may be in fluid communication with the fluid conduit in an in-line configuration. The instability suppression device may be in fluid communication with the fluid conduit in a branch configuration. The instability suppression device may include a reservoir. The compliant interface may include a compressible gas volume within the reservoir. The compliant interface may include a physical interface with the working fluid. The physical interface may include a mechanical bellows providing a compliant interface with the working fluid. The mechanical bellows may contain a compressible fluid. The mechanical bellow may contain a mechanical spring. The physical interface may include an elastically deformable interface with the working fluid.

A flow resistance may be disposed between the conduit and the instability suppression device. The flow resistance may configured to damp flow oscillations between the instability suppression device and the conduit. The fluid communication between the conduit and the instability suppression device may be configured to accept relatively high frequency oscillations, relative to a natural frequency associated with the pressure control valve. The instability suppression device may be configured to separate acoustic wave dynamics frequencies associated with the conduit and a natural frequency associated with the pressure control valve.

According to another implementation, a system may include a pressure vessel configured for containing a working fluid. A pressure control valve configured to provide pressure dependent flow of the working fluid from the pressure vessel. A fluid conduit may couple the pressure vessel and the pressure control valve. An instability suppression device may be in fluid communication with the fluid conduit between the pressure vessel and the pressure control valve. The instability suppression device may include a reservoir configured to maintain a gas volume within the reservoir providing a compliant interface with the working fluid.

One or more of the following features may be included. The compliant interface may include an interface between the gas volume and the working fluid.

According to another implementation, a system may include a pressure vessel configured for containing a working fluid. A pressure control valve may be configured to provide pressure dependent flow of the working fluid from the pressure vessel. A fluid conduit may couple the pressure vessel and the pressure control valve. An instability suppression device may be in fluid communication with the fluid conduit between the pressure vessel and the pressure control valve. The instability suppression device may include a physical interface with the working fluid. The physical interface may have an associated spring constant providing a compliant interface with the working fluid.

DESCRIPTION OF EXAMPLE EMBODIMENTS

Consistent with the present disclosure, an instability suppression device, and a pressurized fluid system including the instability suppression device, are described. In general, an instability suppression device consistent with the present disclosure may stabilize the dynamics of a pressure control valve. According to some embodiments, the instability suppression device may control acoustic pressure oscillation amplitude to allow for stable operation of the pressure control valve. In some implementations, the instability suppression device may change the acoustic mode between a pressure vessel containing a pressurized fluid and the pressure control valve. For example, in particular implementations, the instability suppression device may provide a compliant interface closer to the pressure control valve (relative to the pressure vessel) that may establish an open-open acoustic mode between the pressure vessel and the pressure control device.

Figure 1:
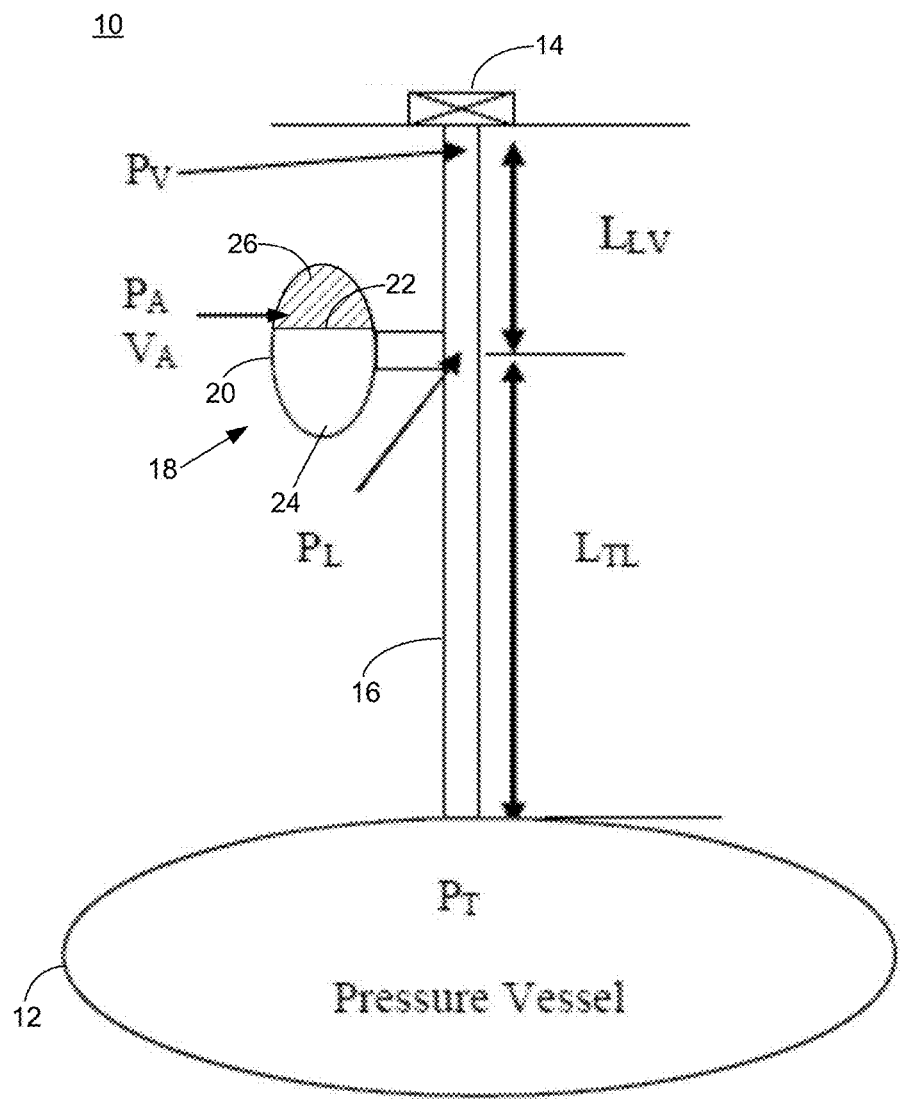
FIG. 1 schematically depicts a pressurized fluid system including an instability suppression device, according to an example embodiment.

For example, and referring to FIG. 1, and illustrative example of a pressurized fluid system 10 is shown. As depicted the pressurized fluid system 10 may include a pressure vessel 12, which may be configured for containing a working fluid. The pressurized fluid system 10 may additional include a pressure control valve 14, which may be configured for pressure dependent flow of the working fluid from the pressure vessel 12. The pressurized fluid system 10 may further include a fluid conduit 16 coupling the pressure vessel 12 and the pressure control valve 14. Additionally, the pressurized fluid system may include an instability suppression device 18 in fluid communication with the fluid conduit 16 between the pressure vessel 12 and the pressure control valve 14. The instability suppression device may provide a compliant interface 20 with the working fluid.

In general, the pressure vessel 12 may include any suitable pressure vessel for containing a working fluid. For example, the pressure vessel 12 may include a storage tank or reservoir, a fluid conveyance system (such as a pipe, or the like), or any other vessel configured to contain the working fluid. The working fluid may include any variety of fluid, including, but not limited to, a gas, a liquid, or a gas-liquid mixture (e.g., which may include a relatively low boiling liquid that may give rise to a liquid-gas state). It will be appreciated that a pressurized fluid system 10 consistent with the present disclose may suitably contain any fluid, and that the pressurized system may operate at any pressure, e.g., that may be above an ambient pressure.

The fluid conduit 16 coupling the pressure vessel 12 and the pressure control valve 14 may include any suitable conduit or pipe, that may be capable of allowing the passage of the working fluid from the pressure vessel 12 to an inlet of the pressure control valve 14. In an implementation in which the pressure vessel 12 may include a piping system containing the working fluid, the fluid conduit 16 may include a pipe of a relatively smaller diameter compared to the piping system.

The pressure control valve 14 (which may also be generally referred to as a "valve" herein) may include any valve that may allow, or restrict, the flow of the working fluid through the pressure control valve 14 in a manner at least partially dependent upon the pressure of the working fluid at an inlet of the pressure control valve. While not illustrated in detail, as is commonly known, pressure control valves may generally include a valve poppet, or valve body, that may engage a valve seat to prevent flow of the working fluid through the valve when the pressure of the working fluid is below a set pressure of the pressure control valve. Further, the valve poppet, or valve body, may disengage from the valve seat to permit flow of the working fluid through the valve when the pressure of the working fluid at the pressure control valve inlet is greater than a set pressure of the pressure control valve. As is known, such pressure control valves may generally include a mechanical, pneumatic, or hydraulic spring mechanism that may bias the valve poppet toward engagement with the valve seat. When the pressure of the working fluid at the inlet of the pressure control valve is greater than the set pressure of the pressure control valve, the working fluid may overcome the biasing force of the spring mechanism to disengage the valve poppet from the valve seat. When the pressure of the working fluid at the inlet of the pressure control valve is less than the set pressure of the pressure control valve, the biasing force of the spring mechanism may overcome the pressure of the working fluid and urge the valve poppet into engagement with the valve seat. As such, the pressure control valve may have a spring force associated with the spring mechanism, and the moving components of the pressure control valve (e.g., the valve poppet, and, in some instances, at least a portion of the spring mechanism) may have a mass. Examples of pressure control valves may include, but are not limited to, pressure relief valves (e.g., such as safety relief valves, overpressure relief valves, or the like), pressure and/or flow regulators, check valves, and the like.

According to an embodiment, the pressurized fluid system 10 may include an instability suppression device 18 in fluid communication with the fluid conduit 16 between the pressure vessel 12 and the pressure control valve 14. As discussed in greater detail below, the instability suppression device 18 may generally change the acoustic dynamics associated with the pressurized fluid system 10 between the pressure vessel 12 and the pressure control valve 14, e.g., to reduce or smooth out the acoustic pressure oscillations at the inlet of the pressure control valve 14 associated with the opening of the pressure control valve 14. In this regard, the instability suppression device 18 may allow the operation of the pressure control valve 14 with reduced cyclic opening and closing induced by acoustic pressure oscillations. In some embodiments, the instability suppression device 18 may allow pressure wave oscillations to be established which may have a greater separation from the natural frequency of the pressure control valve, e.g., by comparison to the pressurize fluid system without the instability suppression device 18.

The instability suppression device 18 may generally include a reservoir 20, or interior volume, which is configured to contain a volume of the working fluid. For example, and as generally described above, the instability suppression device 18 may be in fluid communication with the fluid conduit 16. In this regard, the reservoir 20 of the fluid suppression device 18 may be in fluid communication with the fluid conduit 16 such that the working fluid is capable of flowing into and out of the reservoir 20. While in FIG. 1 the reservoir 20 is shown having a generally elliptical cross-section, it will be appreciated that the reservoir 20 may include other geometries. For example, the reservoir 20 may generally include a spherical, cylindrical, prismatic, or other configuration.

As shown in the example of FIG. 1, the instability suppression device 18 may be in fluid communication with the fluid conduit 16 in a branch configuration. That is, a flow of working fluid through the fluid conduit 16 does not need to pass through the instability suppression device to reach the inlet of the pressure control valve 14. According to such an embodiment, the instability suppression device 18 may include an opening in fluid communication with an opening in the fluid conduit 16. It will be appreciated that fluid communication between the instability suppression device 18 and the fluid conduit 16 may be accomplished in a variety of manners. For example, the instability suppression device 18 may include an opening that is directly coupled with an opening in the fluid conduit 16. Additionally/alternatively, the instability suppression device 18 may be coupled with the fluid conduit 16 via a conduit or pipe extending between the fluid suppression device 18 and the fluid conduit 16.

Figure 2:
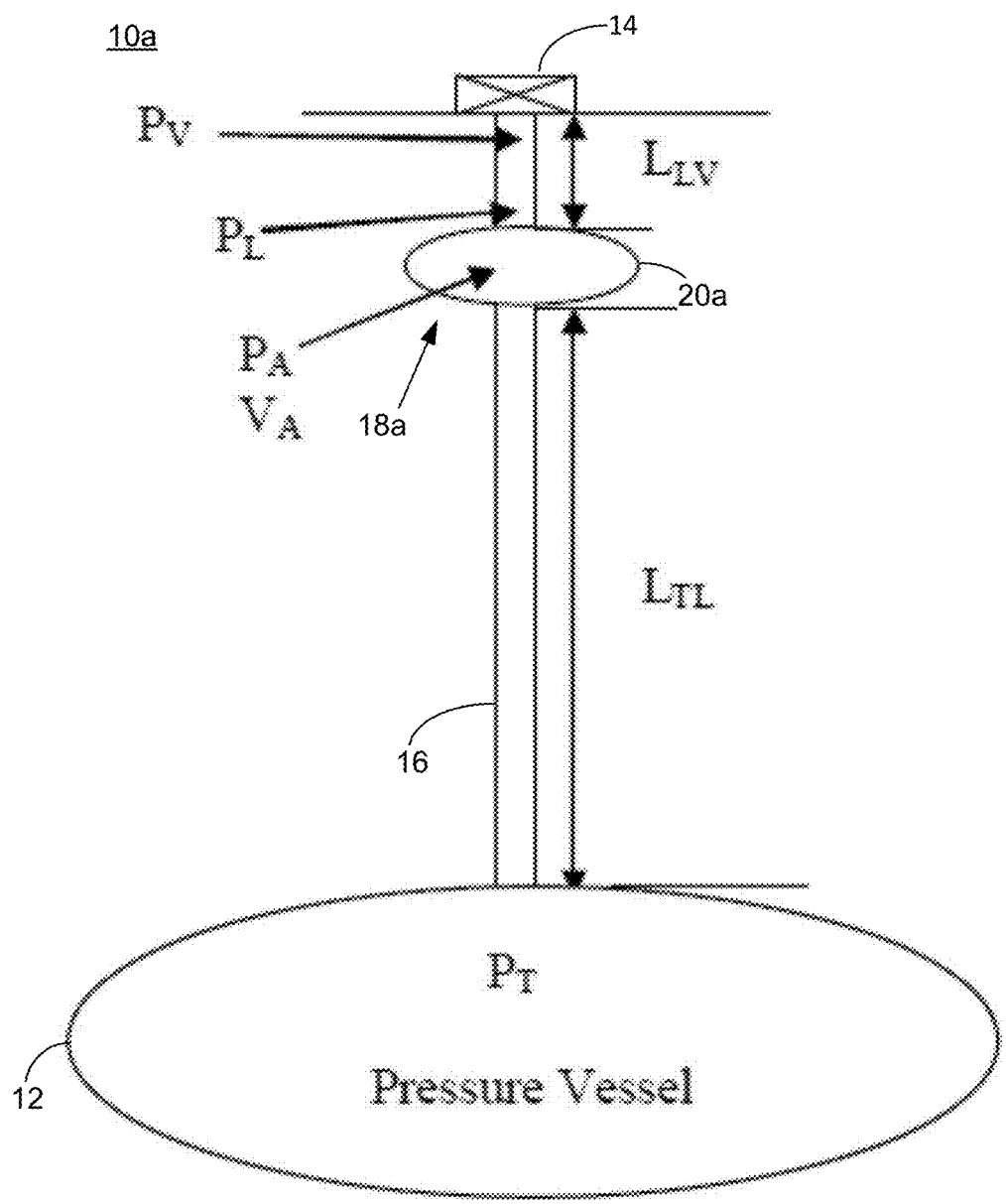
FIG. 2 schematically depicts a pressurized fluid system including another instability suppression device, according to an example embodiment.

Referring also to FIG. 2, in an embodiment the instability suppression device 18a may be in fluid communication with the fluid conduit 16 in an in-line configuration. For example, as shown, the working fluid may flow through the instability suppression device 18a disposed between pressure vessel 12 and the pressure control valve 14. In such a configuration, the instability suppression device 18a may form a portion of the fluid pathway between the pressure vessel 12 and the pressure control valve 14. In an example embodiment, as generally shown in FIG. 2, the instability suppression device 18a may be configured with the reservoir 20a having an annular volume generally surrounding the fluid conduit 16. As such, the pathways of the working fluid between the pressure vessel 12 and the pressure control valve 14 may generally extend through the annular volume of the reservoir 20a of the instability suppression device 18a. While the instability suppression device 18a of FIG. 2 is shown with reservoir 20a having a generally annular volume, it will be appreciated that other configurations may also be utilized. For example, the reservoir 20a may include a spherical, cylindrical, or prismatic configuration.

The instability suppression device 18 may provide a compliant interface 22 with the working fluid. In some embodiments, for example as shown in FIG. 1, the compliant interface 22 with the working fluid may be provided as a compliant interface with the working fluid residing in the reservoir 20 of the instability suppression device 18. In some embodiments, the compliant interface 22 may allow working fluid within the reservoir 20 to flow into, and out from, the reservoir 20 in response to rising and falling pressure oscillations between the pressure vessel 12 and the pressure control valve 14 (e.g., rising and falling pressure oscillations within the fluid conduit 16). In some implementations, the compliant interface 22 may generally provide a relatively soft spring constant against the working fluid. It will be appreciated that the relative softness of the spring constant provided by the compliant interface may vary depending upon the characteristics of the pressurized fluid system 10, for example, depending upon the set pressure of the pressure control valve 14 (i.e., the pressure of the working fluid within the fluid conduit), the dynamics of the pressure control valve 14 (e.g., the mass of the poppet, the spring force of the poppet spring, and the like), characteristics of the working fluid (e.g., density, viscosity, etc.), as well as characteristics of the instability suppression device 18 (e.g., reservoir volume, inlet geometry, etc.), as well as various other characteristics of the pressurized fluid system and the components therein. Principles for determining an appropriate compliance of the compliant interface 22 are discussed in detail below for establishing desirable instability suppression characteristics.

In some implementations, the compliant interface may include a compressible gas volume within the reservoir. For example, as shown in FIG. 1, the reservoir 20 of the instability suppression device 18 may include compliant interface 22, which may be a boundary between a volume of working fluid 24 and a compressible gas volume 26 within the reservoir 20. In some implementations, in which the working fluid may include a gas, the compressible gas volume 26 within the reservoir 20 may include the gaseous working fluid. In such an implementation, the volume of working fluid 24 within the reservoir may also include the gaseous working fluid. In some implementations, in which the working fluid may include a gas-liquid mixture, the compressible gas volume 26 may include a volume of the gaseous component of the gas-liquid mixture of the working fluid. Further, in some implementations, in which the working fluid includes a liquid, the compressible gas volume 26 may include a gas that is different than the working fluid. As generally shown in FIG. 1, in an embodiment in which the instability suppression device 18 may be configured in a branch arrangement relative to the fluid conduit 16, the instability suppression device 18 may be arranged such that the compressible gas volume 26 may generally be retained in the reservoir. For example, the instability suppression device 18 may be oriented such that the compressible gas volume 26 is located above the fluid communication between the instability suppression device and the fluid conduit 16. In this manner, the compressible gas volume 26 may be retained within the reservoir 20, e.g., without being drawn into the fluid conduit 16, for example, when working fluid is released via the pressure control valve 14. With particular reference, to FIG. 2, in a particular example in which the working fluid includes a gas, the reservoir 20a may generally include an annular reservoir around the fluid conduit 16 in an in-line configuration. In such an example, the entirety of reservoir 20a may provide the compressible gas volume compliant interface. In some embodiments consistent with FIG. 2, the working fluid may include a liquid and/or a liquid-gas mixture. According to such an embodiment, the reservoir may be partially filled with liquid and partially filled with gas, with a compliant interface provided at the gas-liquid interface. In such an embodiment, the fluid communication between the reservoir and the fluid conduit may be located such that the fluid communication is at least partially, and/or entirely, below the liquid-gas interface within the reservoir.

Figure 3:
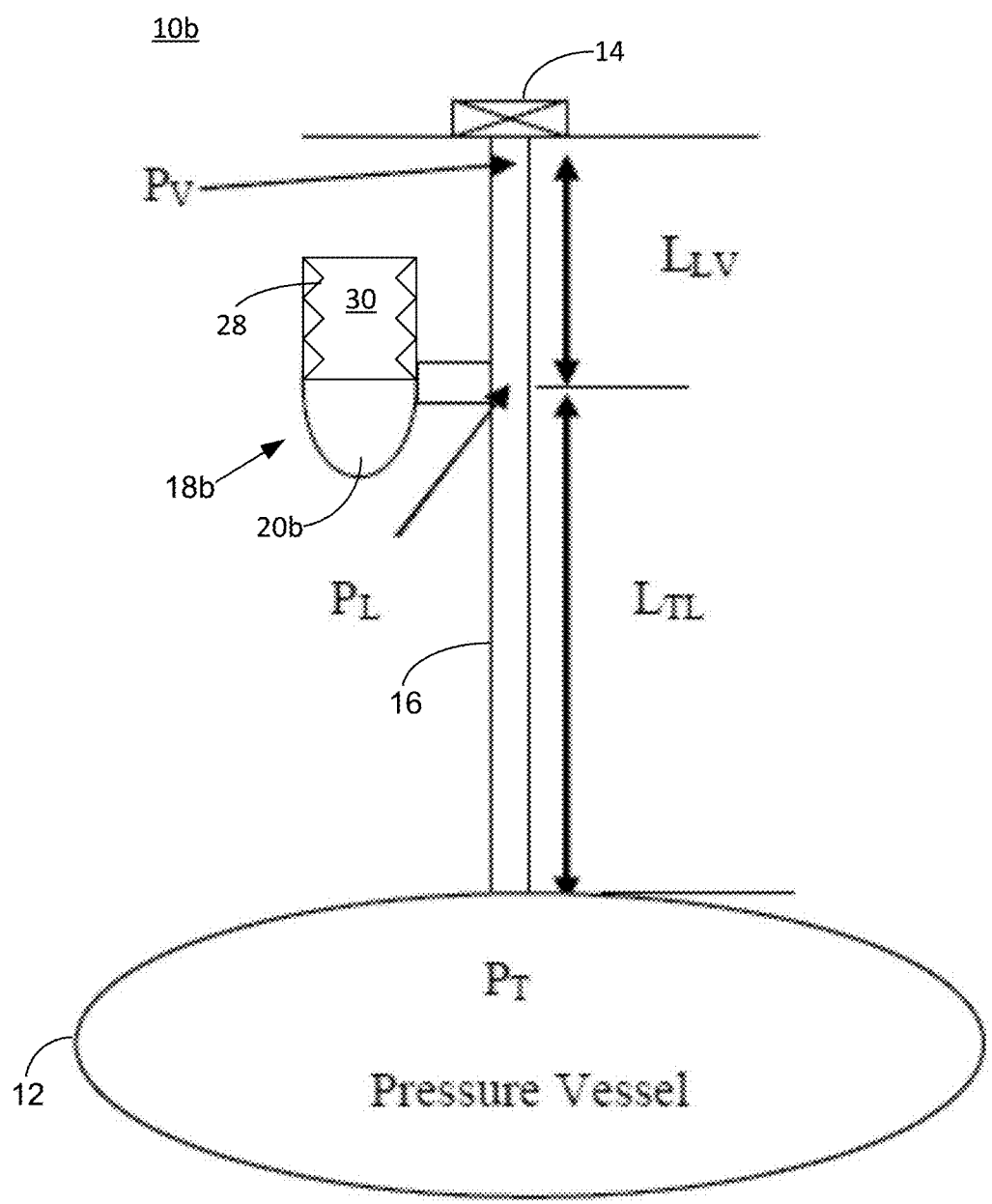
FIG. 3 schematically depicts a pressurized fluid system including yet another instability suppression device, according to an example embodiment.

In some implementations, the compliant interface may include a physical interface with the working fluid. In the previous description, in which the compliant interface may include a compressible gas volume within the reservoir, the compliant interface may include the phase interface between the compressible gas volume and the liquid working fluid. In some further embodiments, a physical interface may be implemented. In some embodiments, the physical interface may include a physical barrier separating the working fluid from the source of compliance. For example, and referring also to FIG. 3, in an embodiment the physical interface may include a mechanical bellows 28, which may provide a compliant interface with the working fluid within the reservoir 20b. For example, the mechanical bellows 28 may be capable of compliant compression and expansion, acting against the working fluid within the reservoir 20b. In this manner the mechanical bellow may provide the compliant interface with the working fluid. The mechanical bellows 28 may be formed from a variety of materials, e.g., depending upon the make-up of the working fluid, the system operating pressures and temperatures, and the like. For example, the mechanical bellows may include a metallic structure, a plastic structure, etc., as well as a structure utilizing a combination of different materials. It will further be appreciated that while the mechanical bellows may include a conventional bellows configuration, such a structure should not be construed as a limitation. As used herein, a mechanical bellows is intended to include any mechanical structure or arrangement which may provide a compliant force against the working fluid within the instability suppression device. Other suitable configurations, without limitation, may include a piston/plunger configuration, an elastic diaphragm, or any other suitable structure.

In an embodiment, the mechanical bellows may be capable of compliant compression and expansion based upon, at least in part a compressible fluid contained within the interior 30 of the mechanical bellows 28. The compressible fluid may provide at least a portion of the desired spring rate of the compliant interface with the working fluid. It will be appreciated that the structure and material of the mechanical bellows may also contribute to, or otherwise impact the spring rate of the compliant interface. For example, a metal mechanical bellows may, itself, provide a spring rate that may contribute to the compliant interface with the working fluid. Accordingly, such factors may be considered in determining a suitable pressure and volume of the compressible fluid contained within the mechanical bellows for providing a desired compliant interface with the working fluid. Additionally, and/or alternatively, the mechanical bellows may include a mechanical spring, which may provide at least a portion of the desired spring rate of the compliant interface. For example, the mechanical spring may urge the mechanical bellows toward an expanded configuration, and may exhibit a desired compliance when the mechanical bellows is acted on the by the working fluid. It will be appreciated that various mechanical springs may be suitably utilized, such as coil springs, cantilever springs, elastic structures, resilient foam materials, etc. Further, such mechanical springs may also be utilized in combination, for example, with a compressible fluid, in providing a desired spring rate of the compliant interface with the working fluid.

Consistent with some embodiments, the physical interface, which forms at least a portion of the compliant interface with the working fluid, may include an elastically deformable interface with the working fluid. As generally mentioned above the mechanical bellows is intended to include any mechanical structure or arrangement that may provide or facilitate the compliant interface with the working fluid. As one particular implementation of such a structure, an elastically deformable interface, such as an elastic diaphragm or membrane, may be provided in contact with the working fluid within the instability suppression device. According to various embodiments, the desired spring rate of the compliant interface may be provided by the elastically deformable interface itself, by a compressible fluid separated from the working fluid by the elastically deformable interface, by a mechanical spring separated from the working fluid by the elastically deformable interface, or the like, including combinations of any of the foregoing.

Consistent with some implementations, the working fluid may include a liquid and/or a gas-liquid mixture. As discussed, e.g., with respect to FIG. 1, in an embodiment in which the compliant interface includes, at least in part, a compressible fluid, such as a compressible gas, the instability suppression device may be arranged and/or oriented such that the compressible fluid may be retained within the reservoir. For example, if the working fluid includes a liquid and the compliant interface includes a compressible gas, the instability suppression device may be oriented such that the compressible gas may remain above the fluid communication between the instability suppression device and the fluid conduit. In an embodiment in which the compliant interface may include a physical interface, such as a mechanical bellows, an elastically deformable interface, or the like, the need for orienting the instability suppression device in a manner to retain the compressible fluid within the reservoir may be obviated. For example, the physical interface may ensure that the compressible fluid may be retained within the reservoir of the instability suppression device.

In an embodiment, a flow resistance may be disposed between the fluid conduit 16 and the instability suppression device 18. For example, the flow resistance may configured to damp flow oscillations between the instability suppression device 18 and the fluid conduit 16. The flow resistance between the fluid conduit 16 and the instability suppression device 18 may include, for example, one or more orifices providing a prescribed total flow area, a mesh screen, or the like, which may suitably damp flow oscillations. For example, in some embodiments, the introduction of an instability suppression device may, in some situations, create a high frequency acoustic mode due to a comparatively short length of fluid between the instability suppression device compliant interface and the pressure control valve inlet. This mode may be damped by introduction of a small screen or other small pressure drop device in the instability suppression device inlet. If coupled flow/valve dynamic oscillations develop in this mode, the small flow pressure drop element in the instability suppression device inlet may introduce sufficient flow damping to stabilize this mode of oscillation. Because the damping provided by this element may be positive at zero flow amplitude of the mode (due to broad band flow turbulence in the main pressure control valve inlet line) and increases with the square of the flow amplitude in the mode, the oscillation amplitude may be positively damped or limited at a safe, non-harmful level.

The fluid communication between the fluid conduit 16 and the instability suppression device 18 may be configured to accept relatively high frequency oscillations, relative to a natural frequency associated with the pressure control valve 14. In some implementations, this may place certain restrictions on acceptable ratios of length/diameter of the fluid communication path flow streamlines between the fluid conduit 16 and the compliant interface within the instability suppression device 18. For example, in a conventional pressurized fluid system including a pressure control valve, an acoustic pressure drop at a pressure control valve inlet may exhibit a cyclic mechanism, with the pressure control valve inlet pressure remaining below a set pressure (i.e., below a pressure at which the valve may open) for the first half of a four-phased cycle of a lowest frequency acoustic mode (e.g., which may be an open-closed organ pipe mode, being open on the pressure vessel end of a fluid conduit coupling the pressure vessel and the pressure control valve because of a relatively large fluid compliance of the pressure vessel, and being closed on the pressure control valve end of the conduit because there is no compliant interface at the valve end). The pressure control valve inlet pressure may be above the set pressure (i.e., above a pressure at which the valve may open) for the last two phases of the cycle. The first half cycle time duration is the time required for the pressure/flow disturbance wave front, traveling at the speed of sound, c, to travel from the pressure control valve to the pressure vessel and back. When the wave front arrives back at the pressure control valve, the compressible fluid flow effects behind the wave may result in the fluid conduit flow being larger than the valve demand flow. Therefore, this flow may be decelerated at the pressure control valve inlet, causing a pressure increase at the pressure control valve inlet that may rise above the pressure control valve set pressure during the last half of the cycle when the acoustic wave travels to the pressure vessel and back again. Since the wave front travels the distance from the pressure control valve to the pressure vessel four times during one cycle, the frequency of the pressure oscillation at the pressure control valve inlet is the speed of sound in the working fluid divided by four times the length of the fluid conduit between the pressure vessel and the pressure control valve.

The acoustic wave phenomenon can also occur in higher order and higher frequency acoustic modes of the system, where wave travel times are shorter according to acoustic wavelengths associated with the higher order modes. The acoustic pressure/flow standing waves may cause oscillations in pressure and flow of varying amplitudes at different points in the pressure control valve fluid conduit system. In the next higher order open-closed acoustic mode, the sound wave starting at the pressure control valve end of the fluid conduit reflects from a pressure node located ⅓ of the length of the fluid conduit upstream of the pressure control valve, therefore this mode has a frequency three times the frequency of the first mode. The higher order modes have frequencies in a progression 5, 7, 9 . . . etc. times the first mode frequency, since higher order open-closed modes have a pressure node progressively closer to the pressure control valve inlet. The instability due to higher order modes coupling with the pressure control valve dynamics may occur in an acoustic mode with frequency near the valve natural frequency of the pressure control valve. Once the pressure control valve is opened and allowing flow out of the pressurized system, instabilities can also occur in open-open acoustic modes of the flow system or in modes that exhibit characteristics of both open-open and open-closed modes.

The oscillations in pressure control valve inlet pressure caused by acoustic wave dynamics, may be a major contributor to repeated rapid opening and closing cycles of the pressure control valve, defined to be unstable operation. If unstable operation continues for a sustained period of time, rapid wear of critical components in the pressure control valve may occur and degrade the intended operational performance of the pressure control valve, and/or change the set pressure due to valve seat damage. Pressure control valve failures may frequently be associated with safety hazards to personnel and equipment. Therefore, stable operation of many different types of valves is critically important.

Consistent with the present disclosure, an instability suppression device may reduce and/or eliminate unstable operation of pressure control valves due to acoustic wave phenomena for a given system installation. In some implementations, conditions and/or characteristics may be implemented with respect to the instability suppression device compliance characteristics, inlet design, and location within the system to achieve desired stability margins. The introduction of an instability suppression device consistent with the present disclosure into a pressurized fluid system, which may provide a compliant interface, may create new system fluid modes of oscillation which may affect stability of the valve. In some implementations, both higher frequency acoustic modes and lower frequency fluid system modes near the valve natural frequency may be considered in device sizing and placement criteria to achieve desired levels of system stability.

As generally discussed above, the compliant interface with the working fluid provided by the instability suppression device may reduce and/or smooth out pressure oscillations arising from the fluid dynamics at the inlet of the pressure control valve. Various characteristics of the instability suppression device may be implemented to achieve a desired instability suppression. Example of such characteristics may include, but are not limited to, a maximum prescribed distance, $L_{LV}$, of the instability suppression device from the inlet of the pressure control valve; a compliance, or spring rate, provided by the compliant interface of the instability suppression device (e.g., which may, in some embodiments, include a minimum gas volume, $V_A$, or compliance analog provided by a mechanical compliant interface, which may be determined by the installation geometry, working fluid properties, valve set pressure, valve natural frequency of oscillation, and damping characteristics, and parameters that describe increased flow rate through the valve associated with pressure differentials across the valve; the inlet/outlet fluid flow path geometry of the instability suppression device (e.g., which may determine fluid inertance of the inlet/outlet flow path), which may be provided within prescribed limits; and an inlet/outlet fluid flow resistance of the instability suppression device may be provided within prescribed limits. Determination of the above, and other, characteristics of the instability suppression device, and/or other characteristics of the pressurized fluid system may be achieved consistent with the principles and calculations set forth below.

Fluid Inertance: Inertance of a fluid is a geometric property of the fluid flow system between two points, a and b, and is defined by the integral, $$I_{ab} = \int_a^b \frac{ds}{A(s)g} \tag{1}$$

where s is a coordinate that follows the central streamline of the flow through the flow system geometry, A(s) is the local effective flow area normal to the central streamline at coordinate value, s, and g is the acceleration due to gravity=386 in/sec2. For example, the Inertance, I, of a straight pipe length, L, with inside diameter, D, is computed by:

$$I = \frac{L}{Ag}$$
$$= \frac{L}{(\pi D^2/4)(386)} \frac{in}{in^2 in/sec^2}$$
$$= \frac{L}{(\pi D^2/4)(386)} \frac{sec^2}{in^2}$$

For more complex flow geometries, the integral form of equation (1) must be used. In situations where there is a sharp discontinuity in flow area, such as for a branch line, as in FIGS. 1.0-2, semi-empirical correction factors may be used for the Inertance computed from straight pipe segments, that take into account the actual streamlines of the flow turning corners and expanding or contracting, as flow passes through pipe sections of abrupt diameter and direction changes. These semi-empirical correction factors for flow vena-contracta effects are based on Rayleigh's solutions (Reference 1: Rayleigh, Lord J. W. S., The Theory of Sound, London, 1877) for flow through a hole in a barrier between two infinite volumes.

For example, for a tube of length, L, and inside diameter, D, allowing flow to communicate to either side of a barrier of infinite dimensions, the approximate vena-contracta correction factor, is to add the inside diameter of the tube to the length of the tube to get an equivalent total Inertance for the flow path. That is, integrating along the center flow streamlines as the streamlines contract to enter the tube and expand into the infinite volume on the other side of the barrier, $$I_{ab} = \int_a^b \frac{ds}{A(s)g} \approx \frac{L+D}{386\pi D^2/4}$$

as derived in Ref 1.

Fluid Compliance: Another important property of fluids relating to their compressibility in fluid dynamics analysis, is a property known as Compliance and is applicable to either gas or liquid compressibility. Isentropic expansion and compression of fluids in designated volumes of a fluid system affecting acoustic modes is assumed, since at the frequencies of oscillation involved, expansion and compression within the specified volume occur so quickly that no heat is transferred into the volume. For gas volumes, pressure, temperature and volume of the gas can change, such that the equation of state, $$P_A V_A^\gamma = \text{Constant} \quad (2)$$

is satisfied where,
$P_A$=Instantaneous pressure in designated gas volume, psi
$V_A$=Volume of gas in designated part of fluid system, $in^3$
$\gamma=(C_P/C_V)$, the ratio of specific heats for gas in the designated volume at constant pressure and constant volume.

Taking a time derivative of eq. (2) and dividing both sides of the equation by $V_A^{\gamma-1}$, we obtain, $$\dot{P}_A V_A + \gamma P_A \dot{V}_A = 0 \quad (3)$$

For the gas volume in the instability stabilization device, the rate of change of volume may be created by movement of an assumed incompressible slug of working fluid oscillating in the device inlet. The weight flow rate of the incompressible slug of fluid out of the device between the device internal pressure PA and the device inlet pressure PL may be provided as, $$W_{AL} = \rho_W A\dot{x} \text{ lb/sec}$$

where $\rho_W$ is the weight density of the fluid in the device inlet, and $\dot{x}$ is the velocity of flow out of the device through an exit area A such that the rate of change of volume, $$\dot{V}_A = -A\dot{x} = -\frac{W_{AL}}{\rho_W} \text{ in}^3/\text{sec}$$

Substituting into (3) yields a differential equation for rate of change of gas pressure within the device, $$\frac{\rho_W V_A}{\gamma P_A} \dot{P}_A = -W_{AL} \text{ lb/sec} \quad (4)$$

Considering eq. (4) for small perturbations in gas volume and pressure about large initial values, it can be assumed that the gas volume may be constant in (4) and a constant known as Compliance can be computed, $$C_A = \frac{\rho_W V_A}{\gamma P_A} = \frac{\rho_W V_A}{\gamma P_O (V_O/V_A)^\gamma} \approx \frac{\rho_W V_O}{\gamma P_O} \text{ in}^2 \quad (5)$$

So that eq. (4) can be written, $$C_A \dot{P}_A = -W_{AL} \text{ lb/sec} \quad (6)$$

Or, $$C_A \ddot{P}_A = -\dot{W}_{AL} \text{ lb/sec} \quad (7)$$

It should be noted that the nomenclature used here for weight flow rate and acceleration of weight flow rate is not conventional, but is consistent with Reference 2 (Doiron, H. H., *Pogo Prevention—A Comprehensive Guide to Theory and Practice*, InDyne Inc. Report No. IDI-H35885D-03-01R1, 9 May 2003, prepared for the NASA Marshall Space Flight Center, Huntsville Ala., Contract No. H35885D) where much more detail on derivation of lumped parameter compressible flow equations for stability analyses is presented.

With regard to the foregoing, it should be remembered that the weight density term in the numerator of eq. (5) may apply to the density of the valve supply piping (e.g., fluid conduit between the pressure vessel and the pressure control valve) working fluid, which may be either liquid or gas, or a mixture of liquid and gas. Therefore, the calculation of device gas Compliance in eq. (5) may be different depending on the weight density of the fluid in the device inlet whose motion causes volume changes in the device gas volume. The gas Compliance and speed of sound differences between liquids, gases and mixtures are the only distinctions that need to be made in sizing the suppression device for liquid, gas or mixture flows through the valve. The Compliance, CL, for liquid filled volumes in the valve supply piping system is derived (Ref. 2) from the definition of Bulk Modulus for liquids, and is computed by, $$C_L = \frac{\rho_L g Vol_L}{\beta_L}$$

where, $\rho_L$ is the mass density of the liquid $\beta_L$ is the effective Bulk Modulus of the liquid including pipe wall elasticity effects, if important. Ref. 2 derives effective bulk modulus for pipe wall elasticity effects.

$Vol_L$ is the volume of the liquid for which Compliance is calculated

In situations where both gas and liquids exist in pockets or mixtures in the valve supply line, the total Compliance for any specific volume can be computed if the values for the separate volume fractions of gas and liquid are known. The gas and liquid Compliance values are computed for their respective sub-volumes, and the total compliance of the mixture for the total volume is computed by, $$C_{TOTAL} = C_{GAS} + C_{LIQUID}$$

Dynamic Equations of Motion for Suppression Device: Newton's 2nd Law for incompressible fluid flow between pressure, PA, in the device gas volume and pressure at the device inlet, PL, is given by, $$P_A - P_L R_{AL} W_{AL} = I_{AL} \dot{W}_{AL}$$

where, $R_{AL}$ is a linear flow resistance coefficient, psi/(lb/sec)

$I_{AL}$ is the Inertance for flow between $P_A$ and $P_L$, psi/(lb/sec$^2$) or, sec$^2$/in$^2$ Substitution with equations (6) and (7) yields a differential equation that relates pressure in the gas volume to inlet pressure transients.

$$\ddot{P}_A + \frac{R_{AL}}{I_{AL}} \dot{P}_A + \omega_A^2 P_A = \omega_A^2 P_L \quad (8)$$

where, $$\omega_A = \sqrt{\frac{1}{C_A I_{AL}}}$$

is the natural frequency of the suppression device in rad/sec and the natural frequency in Hz is given by, $$f_A = \frac{\omega_A}{2\pi} = \frac{1}{2\pi}\sqrt{\frac{1}{C_A I_{AL}}} \quad (9)$$

By defining the resistance coefficient term, $$\frac{R_{AL}}{I_{AL}} = 2\zeta_A \omega_A,$$

where, $\zeta_A$ is the non-dimensional damping ratio of the fluid oscillator defining damping as a fraction of critical damping (oscillator will not oscillate for critical damping)

Then, equation (8) can be written in typical second order oscillator form, $$\ddot{P}_A + 2\zeta_A \omega_A \dot{P}_A + \omega_A^2 P_A = \omega_A^2 P_L \quad (10)$$

Solving equation (6) simultaneously with eq. (10) provides equations defining motion of fluid flow in and out of the device due to pressure fluctuations at the device inlet.

Equations (6) and (10) may be combined with other fluid system acoustic mode dynamic equations, and valve dynamic equations of motion, to examine valve and fluid system stability with the instability suppression device installed.

Instability Suppression Device Design and Installation Considerations. In some implementations, a pressure control valve's dynamic behavior can be described by one or more dynamic modes of oscillation for which we can write equations of motion, $$\ddot{x}_V + 2\zeta_V \omega_V \dot{x}_V + \omega_V^2 x_V = P_V A_V / m_V = \omega_V^2 P_V A_V / k_V \quad (11)$$

where, $x_V$=axial displacement of valve internal components that allow regulation of flow rate through the valve, in.

$k_V$=effective spring constant for the valve considering mechanical spring, mechanical stop stiffness, and fluid aerodynamic spring effects, lb/in.

$m_V$=mass of components moving in the valve with displacement, $x_V$, lb/(386 in/sec$^2$)

$$\omega_V = \sqrt{\frac{k_V}{m_V}},$$

a particular valve mode natural frequency of oscillation, rad/sec $P_V$=Static pressure differential on valve mass causing valve motion, psi $A_V$=Poppet face area on which pressure, $P_V$, acts to create a force on valve mass, in$^2$ $\zeta_V$=damping ratio for a valve that defines the fraction of critical damping The valve natural frequency in Hz is expressed as, $$f_V = \frac{1}{2\pi}\omega_V = \frac{1}{2\pi}\sqrt{\frac{k_V}{m_V}} \quad (12)$$

where this frequency can be regarded as amplitude dependent due to the non-linear relationship between stroke and stiffness due to the presence of the mechanical stop.

The relationship between valve outlet flow and displacement can be expressed by the equation, $$W_V = G_F x_V \quad (13)$$

where, $W_V$ is the instantaneous flow rate exiting the valve, lb/sec $G_F$ is a constant (gain) defining the relationship between valve flow and poppet displacement (lift)

Using (13), and (11) evaluated for harmonic excitation at the natural frequency of the valve, valve flow gain, $G_V$, is defined as, $$G_V = \frac{W_V}{P_V} = G_F \frac{A_V}{2\zeta_V k_V} \quad (14)$$

At the natural frequency of oscillation of the valve, eq. (14) defines the ratio of magnitudes of flow perturbations through the valve as a function of harmonic excitation by valve inlet pressure sinusoidal amplitude.

Large dynamic responses of the valve result when inlet pressure oscillations occur near the natural frequency of oscillation, $f_V$, with maximum possible ratio of valve flow oscillation with respect to inlet pressure oscillation, defined by eq. (14). When acoustic pressure oscillations in the valve supply line are near the valve natural frequency, unstable oscillation may typically result, as mechanical oscillations of the valve respond to oscillations in the driving pressure, $P_V$, and oscillations in $P_V$ are affected by flow fluctuations through the valve caused by oscillations in axial displacement of valve internal components. Instability can occur at frequencies near the acoustic frequencies of the supply line, or near the valve natural frequency.

In order to reduce and/or eliminate unstable operation of various types of valves due to acoustic pressure wave effects, an instability suppression device may be configured to have a minimum gas volume (and/or a minimum Compliance, CA, via eq. (5)) that is a function of the working fluid (gas, liquid or mixture) weight density, $\rho_W$, device gas pressure, $P_A$, device gas ratio of specific heats at constant pressure and constant volume, CP/CV, installation system geometry defined by $L_{LV}$ and $L_{AL}$ ($L_{AL}$ defined in eq. (16) below), valve natural frequency, $f_V$, and damping ratio, $\zeta_V$. In addition, the total Inertance of the fluid flow path between the suppression device gas volume and valve inlet may be restricted to limit acoustic pressure drop magnitude at the valve inlet to a specified value. With this restriction, suppression device volume requirements may be determined by a dynamic stability analysis of the fluid flow system and valve equations of motion.

The Inertance of the fluid between the valve and suppression device inlet is given by, $$I_{LV} = \frac{L_{LV}}{A_P g} \quad (15)$$

where AP is the flow area of the supply line feeding the valve inlet.

The Inertance, $I_{AL}$, of the flow path between the suppression device gas volume and inlet is related to a length of pipe of insider diameter, $A_P$, such that, $$L_{AL} = I_{AL} A_P g = A_P g \int_A^L \frac{ds}{A(s)g} \quad (16)$$

The required gas volume (Compliance) of the instability suppression device may be determined to provide for stable operation of the valve with a desired stability margin. A typical design requirement for stability of dynamic systems may be configured such that the system may be stable for design operating conditions with a Factor of Safety of 2 on critical system parameters. In control systems terminology, this design requirement may be referred to as a 6 db gain margin for system stability. Greater stability margins may be imposed (larger gas volume) when critical parameters affecting system stability such as the valve damping ratio, $\zeta_V$, or natural frequency, $f_V$, are not know with precision in computing the valve gain parameter, $G_V$, in equation (14).

The system stability can be, and was, analyzed with several methods that gave similar results. These analytical results were confirmed by safety relief valve stability tests, with and without the suppression device installed in the system. Using the Nyquist Plot stability analysis method, an algebraic expression was obtained that defines the instability suppression device design and installation parameters required for a desired stability margin. The Nyquist Method was used to compute the total system output/input loop gain defined by the magnitude and phase of flow entering the valve with respect to unit amplitude sinusoidal flow oscillations out of the supply tank. The magnitude, G, of this gain at frequencies when input and output flow disturbances are in phase near the valve natural frequency was computed. Neutral stability (condition where oscillations don't grow or damp out) is obtained when a total zero-phase gain of G=−1 occurs at a frequency near the valve natural frequency. For a typical 6 db gain margin (or factor of 2 on gain required for neutral stability), loop gain is required to be G=−0.5, or half the value of G for which neutral stability occurs.

Through dynamic stability analyses using the Nyquist stability criterion, the critical instability suppression device installation design condition, ignoring small flow resistance effects, is given by the equation:

$$\left(\frac{f_A}{f_V}\right)^2 = 1 - \frac{G[1 + I_{LV}\omega_V(G_v - \omega_V C_V)]}{\frac{I_{AL}\omega_V}{(G_V - \omega_V C_V) + G\omega_V C_L[1 + I_{LV}\omega_V(G_V - \omega_V C_V)]}} \quad (17)$$

Where,
$C_L$ is the Compliance of the fluid in the supply line between the supply tank and the suppression device inlet, $in^2$
$C_V$ is the Compliance of the fluid between the device inlet and valve inlet, $in^2$ In typical cases with higher system pressures that reduce the magnitude of the fluid compliance terms, $C_L$ and $C_V$, and where $G_V \approx (G_V - \omega_V C_V)$, the second term in the denominator of eq. (17) may be ignored and equation (17) can be approximated by a simpler equation form:

$$\left(\frac{f_A}{f_V}\right)^2 = 1 - \frac{G[1 + I_{LV}\omega_V G_v)}{I_{AL}\omega_V G_V} \quad (18)$$

The instability suppression device designer may specify a value for G in equations (17) or (18), depending on how much stability margin is desired with respect to neutral stability. This decision may depend on uncertainty of critical parameters such as valve natural frequency and damping in computing valve flow gain, $G_V$. For a very stable system with zero loop gain near the valve natural frequency, the designer can set G=0 in either equation. This condition states that the suppression device natural frequency must equal the valve natural frequency. Even greater stability margins may be obtained by setting G to values greater than zero. The design penalty for larger than necessary stability margins, is a larger volume suppression device to provide the required gas compliance that controls the device natural frequency via eq. (9).

Instability Suppression Device Minimum Volume Limitation: Smaller volume suppression devices may be used with optimum design of device placement, through selection of $L_{LV}$ and $I_{LV}$ together with design of device inertance, $I_{AL}$, and less restrictive stability margin requirements through selection of G>−1. A minimum possible volume condition may be placed on the instability suppression device design by the limit of allowable pressure drop at the valve inlet resulting from the acoustic wave travel time between the valve and suppression device gas volume.

The time required for an acoustic wave to travel from the valve inlet to the suppression device gas volume and back is given by, $$\tau_{AV} = \frac{2(L_{AL} + L_{LV})}{c} \quad (19)$$

This is the time delay before make-up flow gas from the instability suppression device can reach the valve inlet and begin to reduce the changes in velocity, flow rate, and pressure at the valve inlet after a transient increase in flow rate though the valve. For a safety relief valve, the flow rate change may be an increase from zero flow. For a pressure regulator or check valve, the flow rate change may be from an initial steady state flow and pressure condition.

The acoustic pressure drop (pressure change) at the valve inlet is computed from acoustic wave equation dynamics solutions and is given by, $$\Delta P_V(t) = -\rho c \Delta v_V(t) = -\frac{c \Delta W_V(t)}{A_P g} \quad (20)$$

where,
$\rho$=mass density of fluid in supply line
c=the speed of sound of the fluid in the supply line
$\Delta v$=change in flow velocity at the valve device inlet from initial condition
$\Delta W_V$=change in weight flow rate through the valve from initial condition For a maximum flow rate acceleration, $\dot{W}_{V\ max}$, through the valve associated with valve opening dynamics, the maximum pressure drop at the valve inlet is given by, $$\Delta P_V(t) = -\rho c \Delta v_V(t) \quad (21)$$
$$= -\frac{c \dot{W}_{V\ max}}{A_P g} \tau_{AV}$$
$$= \frac{\dot{c W}_{V\ max} 2(L_{AL} + L_{LV})}{A_P g c}$$

Or, $$\Delta P_V(\tau_{AV}) = 2(I_{AL} + I_{LV})\dot{W}_{V\ max}$$

Equation (21) places a restriction on the flow Inertance values to limit the acoustic wave pressure drop at the valve inlet during the valve opening transient. This restriction on $I_{LV}$ and $I_{AL}$ leads to an associated suppression device gas minimum Compliance, $C_A$, and associated volume, $V_A$, via equation (17). In equations (17) and (18), it can be readily seen that for a given suppression device Inertance, $I_{AL}$, and typical negative value of desired loop gain in the range of, $-1<G<0$ larger values of $I_{LV}$, result in higher instability suppression device natural frequencies associated with smaller device volumes.

According to some implementations, an instability suppression device configured for the lowest frequency mode of fluid oscillation may generally have adequate compliance to suppress higher order acoustic modes. However, in some implementations, in order to suppress instabilities in higher order acoustic modes, the instability suppression device inlet flow geometry and resistance may require further restriction than required to suppress the lowest frequency acoustic mode. The device may be configured to provide sufficiently low inlet flow impedance to accept the high frequency flow oscillations required to suppress acoustic pressure and flow oscillations in higher order, higher frequency modes.

The introduction of a suitably sized instability suppression device may create a higher order open-open organ pipe mode between the pressure vessel and the instability suppression device inlet with frequency computed from speed of sound divided by twice the sound path length from pressure vessel to the instability suppression device compliant interface. The frequency of this mode may be on the order of twice the frequency of the four phased open-closed organ pipe mode between pressure vessel and the pressure control valve without the instability suppression device installed, as discussed previously. When the higher order acoustic modes have sufficient frequency separation from the pressure control valve natural frequency, the higher order acoustic modes may not couple with the pressure control valve dynamics, and no higher ordered mode stability suppression is required. Sufficiently low instability suppression device inlet flow impedance to suppress the lowest frequency open-open organ pipe mode, typically provides adequate suppression for higher ordered modes, since the next higher order mode has half the wavelength of the fundamental open-open organ pipe mode with twice the frequency and two times more frequency separation from the valve natural frequency.

Consistent with the foregoing, in some implementations, the instability suppression device may be configured to separate acoustic wave dynamics frequencies associated with the conduit and a natural frequency associated with the pressure control valve. In some implementations, the location of the instability suppression device, the spring rate of the compliant interface within the instability suppression device, and the flow resistance of the instability suppression device may be selected to avoid creating a new system instability by introducing the instability suppression device into the system.

In some implementations, as the compliance of the instability suppression device compliant interface is increased from near zero to more compliant values, the original fundamental and higher frequency harmonics of the open-closed organ pipe acoustic modes of the system (open flow boundary condition on the pressure vessel end of conduit 16 and closed flow boundary condition on the valve end of conduit 16), with fundamental frequency approximately (Speed of Sound in Working Fluid)/$(4(L_{TL}+L_{LV}))$=$c/(4(L_{TL}+L_{LV}))$ and higher harmonic frequencies, Hz=$Nc/(4(L_{TL}+L_{LV}))$, N=3, 5, 7, . . . , with frequency close enough to the valve natural frequency to cause unstable operation of the valve, may transition to three different fluid pressure and flow oscillation modes of the system (and their harmonics) described below, as modified by the instability suppression device. When the instability suppression device design variables and installation location are selected to cause the three (3) new system frequencies and their harmonic frequencies to be adequately separated from the valve frequency, more stable operation of the valve may result. These three new fluid pressure and flow oscillation modes are:

1. The lowest frequency mode may transition to a fluid oscillation mode characterized by the mass of fluid in the conduit defined by length $L_{TL}$ interacting with the compliant interface of the instability suppression device, and relatively unaffected by speed of sound or compressibility of fluid in the conduit, and will have a $$\text{frequency} < c/(4(L_{TL})$$

with no harmonics and lower frequency with increasing compliance of the compliant interface.

2. The original open-closed organ pipe acoustic mode with $$\text{fundamental frequency approximately} = c/(4(L_{TL} + L_{LV}))$$

and higher harmonic frequencies approximated by $Nc/(4(L_{TL}+L_{LV}))$, $N=1, 3, 5, \ldots$, transition towards a family of open-open organ pipe modes with an open boundary condition at the instability suppression device compliant interface replacing the closed boundary condition at the valve and with $$\text{approximate fundamental frequency} = c/(2L_{TL})$$

and harmonic frequencies given by $Nc/(2L_{TL})$, $N=2, 3, 4, \ldots$.

3. A new open-closed organ pipe mode with open boundary at the instability suppression device compliant interface and closed boundary at the closed valve inlet with acoustic mode frequency approximated by $c/(4L_{LV})$ and higher harmonic frequencies by $Nc/(4L_{LV})$, $N=3, 5, 7, \ldots$.

Complete elimination of the acoustic wave amplitude may not guarantee stability of the valve operation if flow friction pressure losses between the pressure vessel and the pressure control valve are too large. In this case, if the pressure control valve opening causes flow rate high enough to cause large flow friction pressure losses at the valve inlet, the pressure control valve may begin to close due to insufficient pressure to hold it open against the mechanical spring force of the pressure control valve spring. Repeated cycles of the pressure control valve opening and closing due to this excessive flow friction pressure drop is another form of unstable operation of the valve. However, as valve flow increases, the instability suppression device may reduce the rate of pressure drop at the pressure control valve inlet due to flow friction, and in many cases, this may allow the valve to remain open without chatter or instability. In this case, the pressure control valve may operate in a stable manner, but at a flow rate below maximum design flow of the pressure control valve.

In regard to friction pressure losses, the American Society of Mechanical Engineers (ASME) has provided guidelines for designing Section VIII SRV (safety relief valve) installations to ensure stable operation. Consistent with these guidelines, total flow friction pressure drop in the piping system between the pressure vessel and SRV may be limited, at maximum rated flow rate of the SRV, to less than 3 percent of the SRV set pressure. For example, for a set pressure of 250 psig, this allowed pressure drop would only be a 7.5 psi pressure drop. This results in restricting SRV inlet piping to lengths of several feet to preclude excessive friction losses. The guideline does not specifically address acoustic pressure oscillations that are also important to SRV stable operation. However, the guideline does result in short pipe lengths of several feet between pressure vessels and their SRV's, that result in acoustic wave frequencies near enough to SRV natural frequencies of oscillation (determined by their effective spring-mass characteristics including aerodynamic spring effects) to cause unstable operation due to acoustic phenomenon, even when they are stable for the friction pressure loss stability mode.

The instability suppression device disclosed herein may eliminate the inlet piping system acoustic effects on valve stability and may ensure stability of the SRV at frequencies near the natural oscillation frequency of the SRV, and may allow supply line lengths that are longer than the current ASME Section VIII SRV installation stability guideline.

A variety of features of the variable flow rate pump have been described. However, it will be appreciated that various additional features and structures may be implemented in connection with a pump according to the present disclosure. As such, the features and attributes described herein should be construed as a limitation on the present disclosure.

What is claimed is:

1. A system comprising:
a pressure vessel configured for containing a working fluid;
a pressure control valve configured for pressure dependent flow of the working fluid from the pressure vessel;
a fluid conduit coupling the pressure vessel and the pressure control valve; and
an instability suppression device in fluid communication with the fluid conduit between the pressure vessel and the pressure control valve, the instability suppression device providing a compliant interface with the working fluid, wherein the placement of the instability suppression device relative to the pressure control valve and the inertance of the working fluid between the instability suppression device and the pressure control valve are given by the equation $$\left(\frac{f_A}{f_V}\right)^2 = 1 - \frac{G[1 + I_{LV}\omega_V G_v]}{I_{AL}\omega_V G_V}$$

for a total system gain, $G \gg -1$, wherein:
$f_A$ is the natural frequency of the instability suppression device in Hz,
$f_V$ is the natural frequency of the pressure control valve in Hz
$I_{LV}$ is the Inertance for flow between the instability suppression device and the pressure control valve,
$I_{AL}$ is the Inertance of the instability suppression device inlet flow between the compliant interface and the fluid conduit connecting the pressure vessel and the flow control valve,
Gv is the flow gain of the pressure control valve, and
$\omega v$ is valve mode natural frequency of oscillation in radians / second.

2. The system according to claim 1, wherein the working fluid includes a gas.

3. The system according to claim 1, wherein the working fluid includes a liquid.

4. The system according to claim 1, wherein the working fluid includes a gas-liquid mixture.

5. The system according to claim 1, wherein the pressure control valve includes a pressure relief valve.

6. The system according to claim 1, wherein the pressure control valve includes a pressure regulator.

7. The system according to claim 1, wherein the instability suppression device is in fluid communication with the fluid conduit in an in-line configuration.

8. The system according to claim 1, wherein the instability suppression device is in fluid communication with the fluid conduit in a branch configuration.

9. The system according to claim 1, wherein the instability suppression device includes a reservoir, and the compliant interface includes a compressible gas volume within the reservoir.

10. The system according to claim 1, further including a flow resistance disposed between the conduit and the instability suppression device, the flow resistance configured to damp flow oscillations between the instability suppression device and the conduit.

11. The system according to claim 1, wherein the fluid communication between the conduit and the instability suppression device is configured to accept relatively high frequency oscillations, relative to a natural frequency associated with the pressure control valve.

12. The system according to claim 1, wherein the instability suppression device is configured to separate acoustic wave dynamics frequencies associated with the conduit and a natural frequency associated with the pressure control valve.

13. The system according to claim 1, wherein the compliant interface includes a physical interface with the working fluid.

14. The system according to claim 13, wherein the physical interface includes an elastically deformable interface with the working fluid.

15. The system according to claim 13, wherein the physical interface includes a mechanical bellows providing a compliant interface with the working fluid.

16. The system according to claim 15, wherein the mechanical bellows contains a compressible fluid.

17. The system according to claim 15, wherein the mechanical bellow contains a mechanical spring.

18. A system comprising:
a pressure vessel configured for containing a working fluid;
a pressure control valve configured for pressure dependent flow of the working fluid from the pressure vessel;
a fluid conduit coupling the pressure vessel and the pressure control valve; and
an instability suppression device in fluid communication with the fluid conduit between the pressure vessel and the pressure control valve, the instability suppression device including a reservoir configured to maintain a gas volume within the reservoir providing a compliant interface with the working fluid, wherein the placement of the instability suppression device relative to the pressure control valve and the inertance of the working fluid between the instability suppression device and the pressure control valve are given by the equation $$\left(\frac{f_A}{f_V}\right)^2 = 1 - \frac{G[1 + I_{LV}\omega_V G_v]}{I_{AL}\omega_V G_V}$$

for a total system gain, G>−1, wherein:
$f_A$ is the natural frequency of the instability suppression device in Hz,
$f_V$ is the natural frequency of the pressure control valve in Hz
$I_{LV}$ is the Inertance for flow between the instability suppression device and the pressure control valve,
$I_{AL}$ is the Inertance of the instability suppression device inlet flow between the compliant interface and the fluid conduit connecting the pressure vessel and the flow control valve,
Gv is the flow gain of the pressure control valve, and
ωv is valve mode natural frequency of oscillation in radians / second.

19. The system according to claim 18, wherein the compliant interface includes an interface between the gas volume and the working fluid.

20. A system comprising:
a pressure vessel configured for containing a working fluid;
a pressure control valve configured for pressure dependent flow of the working fluid from the pressure vessel;
a fluid conduit coupling the pressure vessel and the pressure control valve; and
an instability suppression device in fluid communication with the fluid conduit between the pressure vessel and the pressure control valve, the instability suppression device including a physical interface with the working fluid, the physical interface having an associated spring constant providing a compliant interface with the working fluid, wherein the placement of the instability suppression device relative to the pressure control valve and the inertance of the working fluid between the instability suppression device and the pressure control valve are given by the equation $$\left(\frac{f_A}{f_V}\right)^2 = 1 - \frac{G[1 + I_{LV}\omega_V G_v]}{I_{AL}\omega_V G_V}$$

for a total system gain, G>−1, wherein:
$f_A$ is the natural frequency of the instability suppression device in Hz,
$f_V$ is the natural frequency of the pressure control valve in Hz
$I_{LV}$ is the Inertance for flow between the instability suppression device and the pressure control valve,
$I_{AL}$ is the Inertance of the instability suppression device inlet flow between the compliant interface and the fluid conduit connecting the pressure vessel and the flow control valve,
Gv is the flow gain of the pressure control valve, and
ωv is valve mode natural frequency of oscillation in radians / second.

* * * * *